(12) United States Patent
Hayashi

(10) Patent No.: US 8,618,714 B2
(45) Date of Patent: Dec. 31, 2013

(54) VEHICULAR BRUSHLESS AC GENERATOR AND EXCITING-COIL BOBBIN UNIT THEREFOR

(75) Inventor: Hideyuki Hayashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 8 days.

(21) Appl. No.: 13/400,941

(22) Filed: Feb. 21, 2012

(65) Prior Publication Data

US 2013/0062988 A1  Mar. 14, 2013

(30) Foreign Application Priority Data

Sep. 13, 2011 (JP) .................................. 2011-199073

(51) Int. Cl.
*H02K 3/32* (2006.01)

(52) U.S. Cl.
USPC .......................................... 310/263; 310/194

(58) Field of Classification Search
USPC .................................................. 310/194, 263
See application file for complete search history.

(56) References Cited

U.S. PATENT DOCUMENTS

| | | | | |
|---|---|---|---|---|
| 3,995,244 | A * | 11/1976 | Sayo | 335/296 |
| 5,097,169 | A * | 3/1992 | Fukushima | 310/263 |
| 6,967,423 | B2 | 11/2005 | Kuroda et al. | |
| 7,514,837 | B2 | 4/2009 | Kuroda et al. | |
| 2005/0046306 | A1 | 3/2005 | Kuroda et al. | |
| 2007/0018531 | A1 | 1/2007 | Kuroda et al. | |

FOREIGN PATENT DOCUMENTS

| | | |
|---|---|---|
| JP | 2005-080440 A | 3/2005 |
| JP | 2007-037233 A | 2/2007 |

* cited by examiner

*Primary Examiner* — Dang Le
(74) *Attorney, Agent, or Firm* — Sughrue Mion, PLLC

(57) ABSTRACT

A vehicular brushless AC generator includes: a bobbin disposed surrounding the axial end face of the thick ring portion of the yoke and the outer circumferential surface of the cylindrical portion so that an exciting coil can be wound thereon; a plate extending radially outwardly from an end of the cylindrical portion, for joining the bobbin to the yoke; and a stator disposed outside the rotor retaining an air gap, in which magnetic flux produced by the exciting coil propagates; wherein the bobbin is provided with a thick portion for extending a creeping distance, formed along the outer circumferential edge of the bobbin joined to the yoke.

7 Claims, 3 Drawing Sheets

VEHICULAR BRUSHLESS AC GENERATOR AND EXCITING-COIL BOBBIN UNIT THEREFOR

BACKGROUND OF THE INVENTION

1. Field of the Invention

The present invention relates to a vehicular brushless AC generator and an exciting-coil bobbin unit therefore mounted on motor vehicles such as an automobile, bus and truck.

2. Description of the Related Art

A conventional vehicular brushless AC generator includes an exciting-coil bobbin unit, which is formed of resin with a uniform thickness so that the bobbin will not be easily deformed.

Patent Document 1 disclosed a structure of joining a yoke with a plate is employed that decreases the inner diameter of a bobbin while ensuring strength of supporting the plate, and in order to obtain a field-coil bobbin unit for a brushless alternator that can reduce the material for the field coil, thereby enabling cost down while ensuring vibration resistance, an annular step portion is formed on an end side of the inner circumferential surface of a thick ring-shaped second yoke, the other axial end of a cylindrical portion of the plate is engaged with the step portion as radially overlapping each other, and the cylindrical portion of the plate is joined to the second yoke by welding in the region of the cylindrical portion radially overlapping the step portion.

Moreover in Patent Document 2, in order to provide a brushless alternator in which an output current is enhanced by configuring an optimized magnetic circuit, the alternator includes: a step portion provided on an inner circumferential surface of an axial end portion of a yoke; a plate having a cylindrical portion fixed to this step portion and made of magnetic material; a bobbin disposed surrounding the radial outer circumferential surface of the cylindrical portion of the plate so that a field coil is wound thereon; and a stator provided outside a rotor retaining an air gap, in which magnetic flux produced by the field coil propagates; wherein the cylindrical portion of the plate fixed to the step portion provided on the inner circumferential surface of the yoke is formed to have a radial thickness of greater than 1 mm but smaller than 2 mm.

Patent Document 1: Japanese Laid-Open Patent Publication No. 2005-80440

Patent Document 2: Japanese Laid-Open Patent Publication No. 2007-37233

However, in the conventional vehicular brushless AC generator, the thickness of the bobbin unit made of resin has greatly affected its output characteristics, and if the thickness of the bobbin is reduced, the creeping distance to the yoke with which the bobbin is engaged will be shortened, causing a concern in that the electrolytic corrosion resistance of the exciting coil would be deteriorated between the yoke at low potential and the exciting coil at high potential.

Moreover, another concern has been that bobbin thin portions would be deformed when the bobbin is molded or an exciting coil is wound thereon in production process of the exciting-coil unit, leading to loss of productivity.

SUMMARY OF THE INVENTION

The present invention has been made to resolve the foregoing problems, and aims at providing a vehicular brushless AC generator and an exciting-coil bobbin unit therefore in which magnetic resistance can be reduced and high output with high efficiency can be ensured without deteriorating electrolytic corrosion resistance in a bobbin unit in which the exciting coil is disposed.

A vehicular brushless AC generator according to the present invention comprises: a rotor fixed to a shaft; a yoke, opposed to the rotor via a radially-formed air gap, including a thick ring-shaped portion fixed to an inner wall of a bracket for rotatably supporting the shaft, and a cylindrical portion formed in an inner circumferential side on an axial end face of the thick ring-shaped portion; a bobbin disposed surrounding the outer circumferential surface of the cylindrical portion of the yoke so that an exciting coil can be wound thereon; a plate extending radially outwardly from an end of the cylindrical portion, for joining the bobbin to the yoke; and a stator disposed outside the rotor retaining an air gap, in which magnetic flux produced by the exciting coil propagates; wherein the bobbin is provided with a thick portion for extending a creeping distance, formed along the outer circumferential edge of the bobbin joined to the yoke.

According to the present invention, the creeping distance between the yoke constituting the exciting coil and the exciting coil can be extended in a vehicular brushless AC generator, the electrolytic corrosion resistance can be thereby prevented from deteriorating, and also bobbin strength against deformation can be enhanced, so that productivity in its handling and winding the exciting coil thereon can be enhanced.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
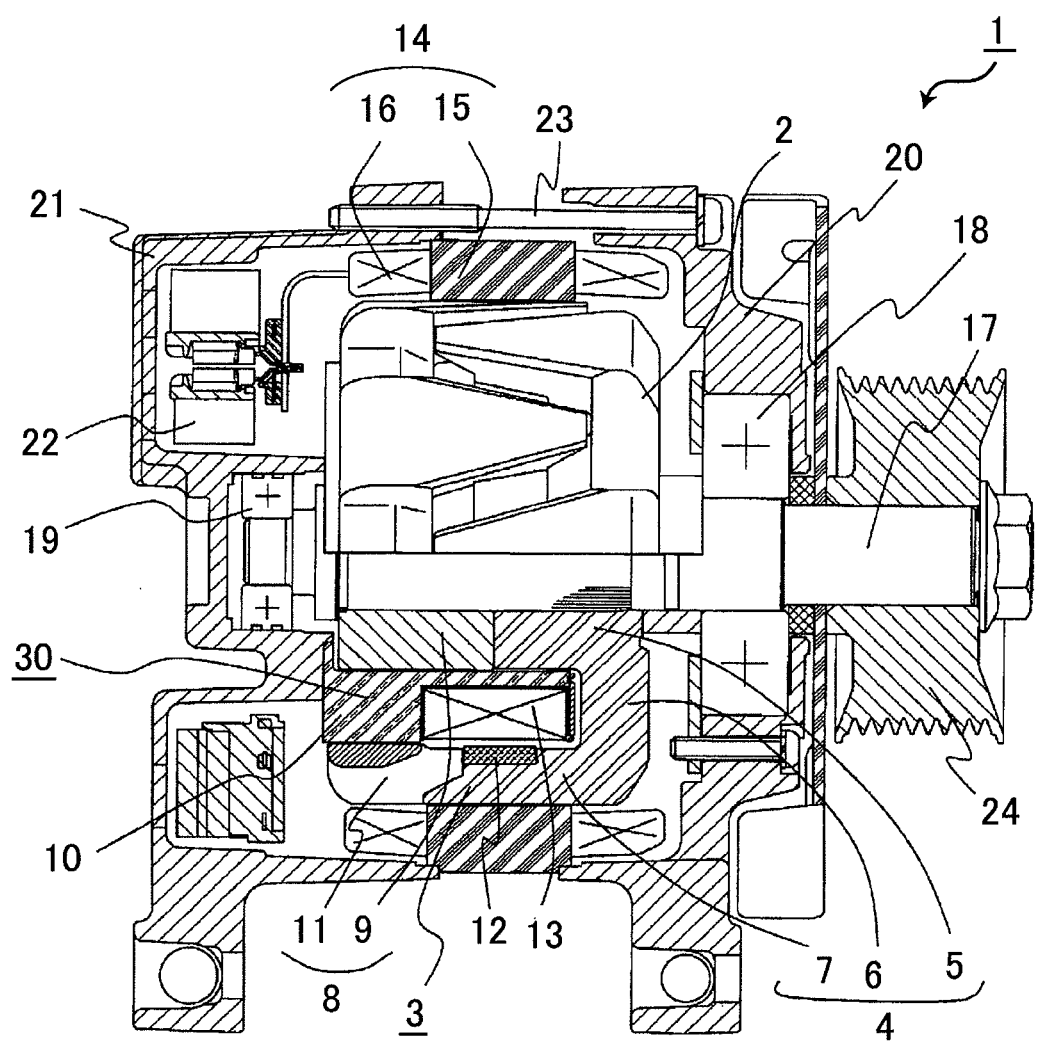
FIG. 1 is an axial cross-sectional view showing the configuration of a vehicular brushless AC generator according to Embodiment 1 of the present invention.

Firstly, the configuration of a vehicular brushless AC generator 1 according to Embodiment 1 of the present invention will be described. In FIG. 1, a rotor 2 is fixed to a shaft 17, this rotor 2 further includes a magnetic pole core 3 for transmitting magnetic flux, and this magnetic pole core 3 is constituted of a first magnetic pole core 4 and a second magnetic pole core 8.

A first boss portion 5 constituting the first magnetic pole core 4 is provided with an insertion hole (not shown in the figure) for the shaft 17 to be inserted through at the axis center. Moreover, a ring-shaped first yoke 6 is extended radially outwardly from an end of the first boss portion 5, and furthermore a first claw-shaped magnetic pole portion 7 is extended axially from the outer circumferential surface of the first yoke 6 toward the other end of the boss portion.

Here, the shaft 17 is press-fitted into the insertion hole (not shown) made at the axis center of the first magnetic pole core 4, and fixed to the pole core non-rotatably relative to each other.

On the other hand, a second boss portion 9 constituting the second magnetic pole core 8 is provided with an insertion hole (not shown) at the axis center for the shaft 17 to be inserted through, the same as the first magnetic pole core 4. A second yoke 10 that is ring-shaped and fixed to a second bracket 21 is disposed radially outside this second boss portion 9 retaining a very narrow air gap therebetween.

Moreover, as will be described later, an exciting coil 13 is fixed to an axial end of the second yoke 10 by the plate 31 and the bobbin 32.

Furthermore, a second claw-shaped magnetic pole portion 11 is disposed radially outside the second yoke 10 via a very narrow air gap. This second claw-shaped magnetic pole portion 11 is fixed to the first claw-shaped magnetic pole portion 7 by way of a ring 12 made of non-magnetic material disposed radially in the inner circumferential side of the first claw-shaped magnetic pole portion 7, and disposed as engaging with the pole portion 7.

Moreover, the shaft 17 is press-fitted into the insertion hole (not shown) made at the axis center of the second magnetic pole core 8, and fixed to the pole core non-rotatably relative to each other, with the axial end face of the second boss portion 9 abutted on the other axial end face of the first boss portion 5.

Furthermore, a stator 14 includes a stator core 15 on which a stator winding 16 is wound, and is disposed as surrounding the outer circumferential surface of the rotor 2.

A first bracket 20, together with the second bracket 21, clamps the stator core 15 with a through bolt 23 with the shoulder portions at both ends of stator core 15 sandwiched between those brackets. And, the first bracket 20 rotatably supports an end of the shaft 17 by way of a first bearing 18, and the second bracket 21 rotatably supports the other end of the shaft by way of a second bearing 19. The rotor 2 is thereby rotatably disposed inside the first bracket 20 and second bracket 21. Furthermore, a pulley 24 is fixed to the end of the shaft 17 that is outwardly extended from the first bracket 20, and set to be driven by the engine (not shown).

Figure 2:
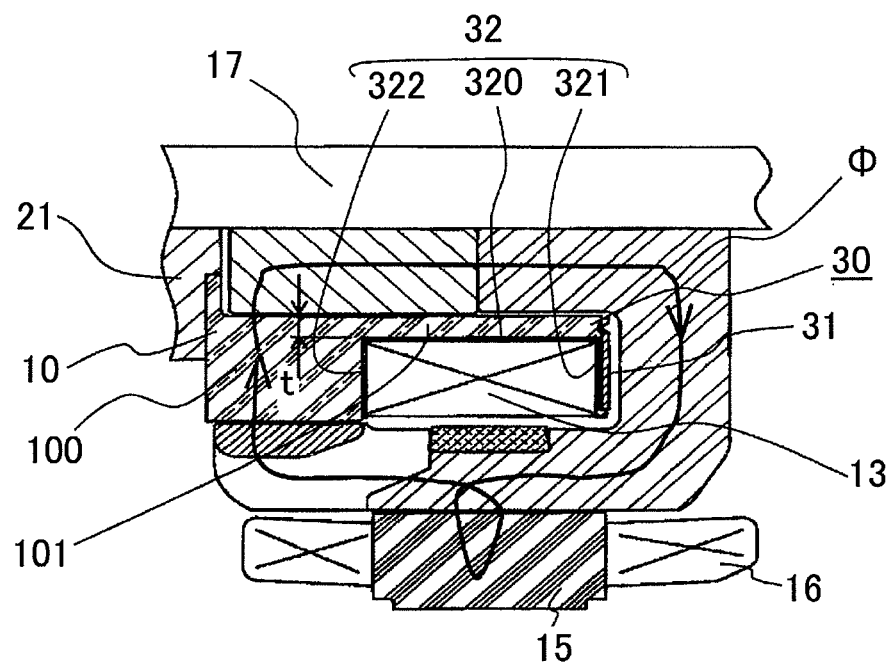
FIG. 2 is an axial essential-portion cross-sectional view of the vehicular brushless AC generator in FIG. 1.

In the vehicular brushless AC generator 1 as configured above, a current is supplied from a battery (not shown) to the exciting coil 13, and magnetic flux $\Phi$ is thereby produced around the coil 13 as shown in FIG. 2.

This magnetic flux $\Phi$ flows through a path in such a way that the flux propagates from the second yoke 10 to the second boss portion 9 via the very narrow air gap retained radially in the inner side of the yoke, then passes the first boss portion 5 that abuts the second boss portion 9 on the end face thereof, the first yoke 6 and the first claw-shaped magnetic pole portion 7, crosses the stator 14 disposed in the radial outer side of the rotor 2, following that, the flux $\Phi$ passes the second claw-shaped magnetic pole portion 11 and a very narrow air gap provided in the radial inner side thereof, and finally returns to the second yoke 10. Therefore, the first claw-shaped magnetic pole portion 7 and the second claw-shaped magnetic pole portion 11 are magnetized into N and S poles, respectively.

Meanwhile, the pulley 24 is driven by the engine so that the shaft 17 to which the pulley is directly joined rotates, thereby rotating the rotor 2. The magnetic field produced by the exciting coil 13 also rotates in accordance with the rotation. The magnetic flux $\Phi$ constituting this rotating magnetic field is transmitted to the stator core 15 through the foregoing path, which generates AC electromotive force in the stator winding 16. An AC current produced by this electromotive force in the stator winding 16 is rectified by the rectifier 22 into a DC current, and the battery (not shown) is thereby charged up.

At this moment, since the exciting coil 13 is mounted on the second yoke 10 fixed to the second bracket 21, the coil does not rotate, but the first magnetic pole core 4 that is integrally formed of the first boss portion 5, the first yoke 6 and the first claw-shaped magnetic pole portion 7, the second boss portion 9 and second claw-shaped magnetic pole portion 11 of the second magnetic pole core 8 rotate.

Figure 3:
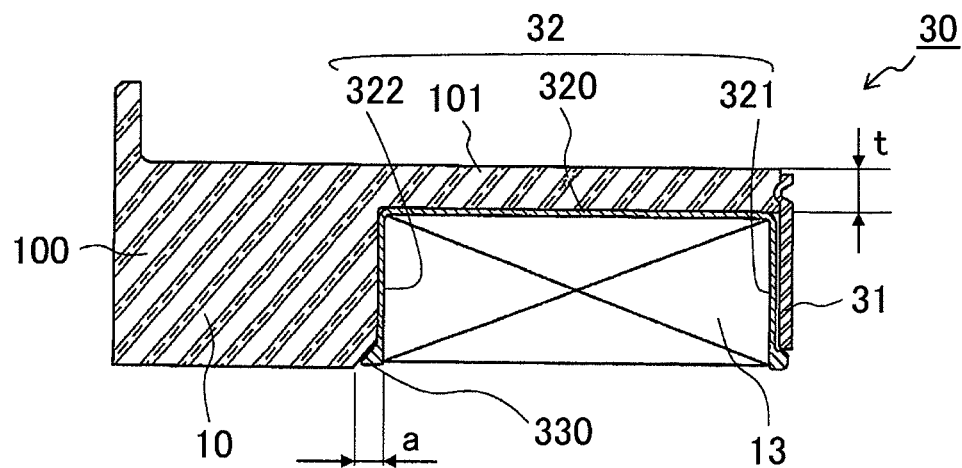
FIG. 3 is an enlarged axial cross-sectional view showing an exciting-coil bobbin unit according to Embodiment 1.

FIG. 3 is an enlarged axial cross-sectional view showing an exciting-coil bobbin unit including the second yoke 10; the bobbin unit 30 includes the second yoke 10 fixed to the second bracket 21, a plate 31 joined to the second yoke 10 by projection- or spot-welding, and a bobbin 32 that is disposed in a space created by the second yoke 10 and the plate 31 and on which the exciting coil 13 is wound.

Figure 4:
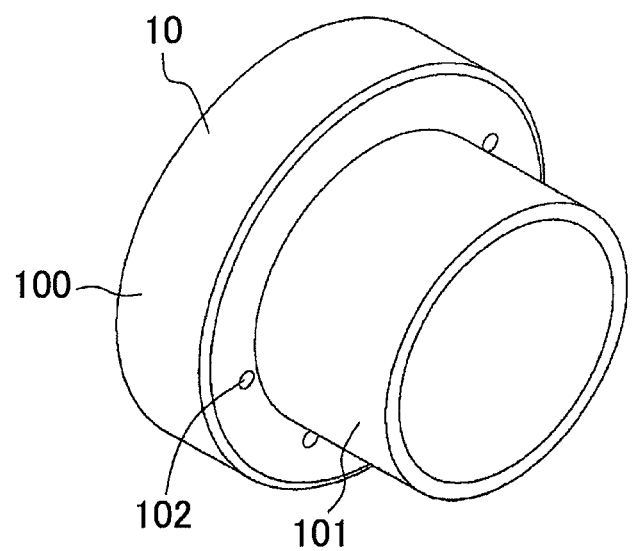
FIG. 4 is a perspective view showing a yoke of the exciting-coil bobbin unit in FIG. 3.

The second yoke 10 is constituted of a thick ring portion 100 that is ring-shaped and whose cross section is rectangular and a cylindrical portion 101 that is extended using the same material, from an axial end face of this thick ring portion 100 (refer to FIG. 4). In order to optimize generation efficiency and also rigidly fix the plate 31 to an end face of the second yoke 10, the cylindrical portion 101 is formed annularly with a thickness of "t" over a range from the end face of the thick ring portion 100 to the end face portion of the bobbin. The plate 31 is made by pressing a mild steel plate and extended radially outwardly from the end of the cylindrical portion 101 of the second yoke 10, and joins the bobbin 32 to the second yoke 10.

Figure 5:
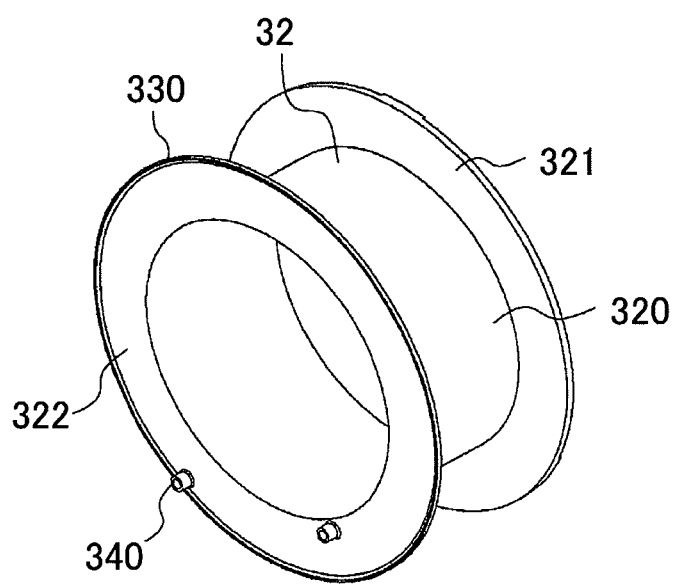
FIG. 5 is a perspective view showing a bobbin of the exciting-coil bobbin unit in FIG. 3.

Moreover, the bobbin 32 is molded from nylon resin and includes a cylindrical portion 320 for engaging with the radial outer surface of the cylindrical portion 101 of the second yoke 10, and in addition, a first discoid flange 321 and second discoid flange 322 are provided at both ends of the cylindrical portion 320, extending radially outwardly from those ends (refer to FIG. 5). The second flange 322 is provided with protrusions 340 that are inserted into a plurality of holes 102 made on the end face of the thick ring portion 100 of the second yoke 10.

The thickness of the cylindrical portion 320, the first flange 321 and second flange 322 of this bobbin 32 is reduced to some 0.5 mm, for example, thinner than that of a conventionally structured bobbin, which decreases the magnetic resistance between the exciting coil 13 and the second yoke 10 as well as increases the volume of winding space for the exciting coil 13 wound inside the bobbin 32, thereby increasing the rotating magnetic flux, so that an output current can be enhanced.

However, the reduction in the thickness of the second flange 322 of the bobbin 32 here will shorten the creeping distance "a" between the outer circumference of the exciting coil 13 wound inside the bobbin 32 and that of the second yoke 10, causing a concern with deterioration in electrolytic corrosion resistance.

In this Embodiment, as shown in FIG. 3, a thick portion 330 is formed along the outer circumferential edge of the second flange 322 of the bobbin 32 joined to the second yoke 10, tapering from the outer circumference toward an inner circumference of the flange. The widthwise dimension (in the axial directions of the bobbin 32) of this thick portion 330 is set to, for example, 0.8 to 1.0 mm, so as to extend the creeping distance "a" between the outer circumference of the exciting coil 13 and that of the second yoke 10.

This not only enables high output with high efficiency without leading to deterioration of the electrolytic corrosion resistance of the exciting coil, but also prevents reduction in strength of the bobbin 32 due to the thickness reduction, and resultantly enhances bobbin strength against deformation, so that productivity in its handling and winding the exciting coil thereon can be enhanced.

As described above, a vehicular brushless AC generator according to the present invention comprises: the rotor 2 fixed to the shaft 17; the yoke 10, opposed to the rotor via a radially-formed air gap, including the thick ring portion 100 fixed to the inner wall of the bracket 20 and bracket 21 for rotatably supporting the shaft, the cylindrical portion 101 formed in an inner circumferential side on an axial end face of the thick ring portion; the bobbin 32 disposed surrounding the axial end face of the thick ring portion of the yoke and the outer circumferential surface of the cylindrical portion so that the exciting coil 13 can be wound thereon; the plate 31 extending radially outwardly from an end of the yoke cylindrical portion, for joining the bobbin to the yoke; and the stator 14 disposed outside the rotor retaining an air gap, in which magnetic flux produced by the exciting coil propagates; wherein the bobbin 32 is provided with the thick portion 330 for extending the creeping distance, formed along the outer circumferential edge of the bobbin joined to the yoke. Therefore, the creeping distance between the yoke constituting the exciting coil and the exciting coil in a vehicular brushless AC generator can be extended, the electrolytic corrosion resistance can be prevented from deteriorating, and also bobbin strength against deformation can be enhanced, so that productivity in its handling and winding the exciting coil thereon can be enhanced.

Various modifications and alterations of this invention will be apparent to those skilled in the art without departing from the scope and spirit of this invention, and it should be understood that this is not limited to the illustrative embodiments set forth herein.

What is claimed is:

1. A vehicular brushless AC generator, comprising:
    a rotor fixed to a shaft;
    a yoke, opposed to the rotor via a radially-formed air gap, the yoke comprising a thick ring portion fixed to an inner wall of a bracket for rotatably supporting the shaft, and a cylindrical portion formed in an inner circumferential side on an axial end face of the thick ring portion;
    a bobbin disposed to surround the axial end face of the thick ring portion of the yoke and an outer circumferential surface of the cylindrical portion so that an exciting coil can be wound around the bobbin;
    a plate extending radially outwardly from an end of the cylindrical portion, for joining the bobbin to the yoke; and
    a stator disposed outside the rotor, in which magnetic flux produced by the exciting coil propagates; wherein
    the bobbin is provided with a thick portion for extending a creeping distance, the thick portion being formed over all of an outer circumferential edge of the bobbin joined to the yoke and between the thick ring portion of the yoke and the bobbin.

2. A vehicular brushless AC generator according to claim 1, wherein the bobbin includes a cylindrical portion that engages with the cylindrical portion of the yoke and discoid flanges that radially extend from both ends of the cylindrical portion of the bobbin, and the thick portion is formed along an edge of one of the discoid flanges of the bobbin joined to the thick ring portion of the yoke, tapering from an outer circumferential side toward an inner circumferential side of the one flange.

3. A vehicular brushless AC generator according to claim 1, wherein the cylindrical portion of the bobbin and the-flanges thereof excluding the thick portion are thinned.

4. A vehicular brushless AC generator according to claim 1, wherein:
    the bobbin comprises a flange which contacts the thick ring portion of the yoke, the flange comprising the thick portion and a thin portion which is thinner than the thick portion, and
    the thick portion of the bobbin creates more space between the thick ring portion of the yoke and the exciting coil, as compared to an amount of space created between the thick ring portion of the yoke and the exciting coil by the thin portion.

5. An exciting-coil bobbin unit for a vehicular brushless AC generator, comprising:
    a yoke including a thick ring portion fixed to an inner wall of a bracket of the vehicular brushless AC generator and a cylindrical portion formed in an inner circumferential side on an axial end face of the thick ring portion;
    a bobbin disposed to surround the axial end face of the thick ring portion of the yoke and an outer circumferential surface of the cylindrical portion so that an exciting coil of the vehicular brushless AC generator can be wound around the bobbin; and
    a plate extending radially outwardly from an end of the cylindrical portion, for joining the bobbin to the yoke; wherein the bobbin is provided with a thick portion for extending a creeping distance, the thick portion being formed along an outer circumferential edge joined to the yoke and between the thick ring portion of the yoke and the bobbin.

6. An exciting-coil bobbin unit for a vehicular brushless AC generator according to claim 5, wherein the bobbin includes a cylindrical portion that engages with the cylindrical portion of the yoke and discoid flanges that radially extend from both ends of the cylindrical portion of the bobbin, and the thick portion is formed along an edge of one of the discoid flanges joined to the yoke, tapering from an outer circumferential side to an inner circumferential side of the one flange.

7. An exciting-coil bobbin unit for a vehicular brushless AC generator according to claim 5, wherein the cylindrical portion of the bobbin and flanges thereof excluding the thick portion are thinned so as to increase a volume of winding space for the exciting coil.

* * * * *